United States Patent [19]

Kawana et al.

[11] Patent Number: 4,734,569
[45] Date of Patent: Mar. 29, 1988

[54] IC CARD

[75] Inventors: Shigeyuki Kawana; Harumi Nakano, both of Tokyo, Japan

[73] Assignee: Casio Computer Co., Ltd., Tokyo, Japan

[21] Appl. No.: 894,764

[22] Filed: Aug. 8, 1986

[30] Foreign Application Priority Data

Aug. 22, 1985 [JP] Japan .................. 60-184435

[51] Int. Cl.[4] .................................. G06K 19/06
[52] U.S. Cl. ........................ 235/487; 235/380
[58] Field of Search .................. 235/487, 380

[56] References Cited

U.S. PATENT DOCUMENTS 4,092,524  5/1978  Moreno .................. 235/487

Primary Examiner—Harold I. Pitts
Attorney, Agent, or Firm—Frishauf, Holtz, Goodman & Woodward

[57] ABSTRACT

When identification data stored in a predetermined area of a data memory in an IC card and data supplied from a card terminal coincide, the data stored in the data memory is substantially erased.

8 Claims, 10 Drawing Figures

IC CARD

BACKGROUND OF THE INVENTION

This invention relates to an IC card which is used as a cash card or a credit card issued by a financial institution, such as a bank.

The present time has been called a cashless era, and goods can be purchased without using cash, simply by utilizing cards issued by credit card companies or the like. Plastic cards, embossed cards, magnetic stripes cards, etc. are usually used as cash or credit cards. These cards, however, have structures which can be easily forged, and their improper use is a significant problem. To solve this problem, an information card has recently been developed, which is commonly termed an IC card, in which an IC circuit with a secret key number, etc. stored therein is assembled such that the secret key number can not be readily externally read out. This IC card is difficult to forge and thus has excellent security, and it can also store a large quantity of information.

The IC card as noted above is delivered to a customer via an IC card manufacturing stage, an IC card issuing stage, and a personal information number (PIN) registration stage. After manufacture, the IC card is sent by mail or the like. Therefore, in the event of the IC card being stolen in transit, it is then possible to carry out a fraudulent transaction, using a real IC card rather than a forged one. For example, when the IC card is stolen between the manufacturing step and issuing step, it may be used by falsely writing data which is usually written subsequent to the card being issued.

Meanwhile, even after an IC card has been delivered to a customer through a regular route, the following inconvenience will occur.

The important data, such as the PIN noted above, is stored in a data memory, consisting, for instance, of an EP-ROM provided in the IC card. Since the IC card is carried by the customer in various ways, it is likely that data stored in the data memory might be altered by the influence of static electricity and ultraviolet rays. In such a case, however, there is no means for detecting any occurrence of alteration of data due to an abnormality in the memory, so that a transaction involving use of the IC card may possibly be effected with erroneous data.

SUMMARY OF THE INVENTION

Accordingly, an object of this invention is to provide an IC card, of which forgery and improper use can be prevented, and which has improved security and reliability.

Another object of the invention is to provide an IC card which can prevent occurrence of a fraudulent transaction, through attempting to use it when it has been stolen in transit after its manufacture, in that no data can be read out or written in it in such a case.

A further object of the invention is to provide an IC card, which, in the event of alteration of data stored in its data memory, prevents execution of a transaction with it based on the erroneous data and which informs the card holder the abnormality of the memory beforehand.

According to the invention, there is provided an IC card, which comprises:

memory means having at least one memory area for storing secret data therein;

means for reading out data stored in the memory means;

first comparator means for checking whether externally supplied data and data read out by the reading means are coincident; and means for substantially erasing said data stored in the memory means when the coincidence of data compared in the first comparator means is detected.

DETAILED DESCRIPTION OF THE PREFERRED EMBODIMENT

An embodiment of this invention will be described with reference to the accompanying drawings.

[IC Card Manufacturing and Issuing Steps]

Figure 1:
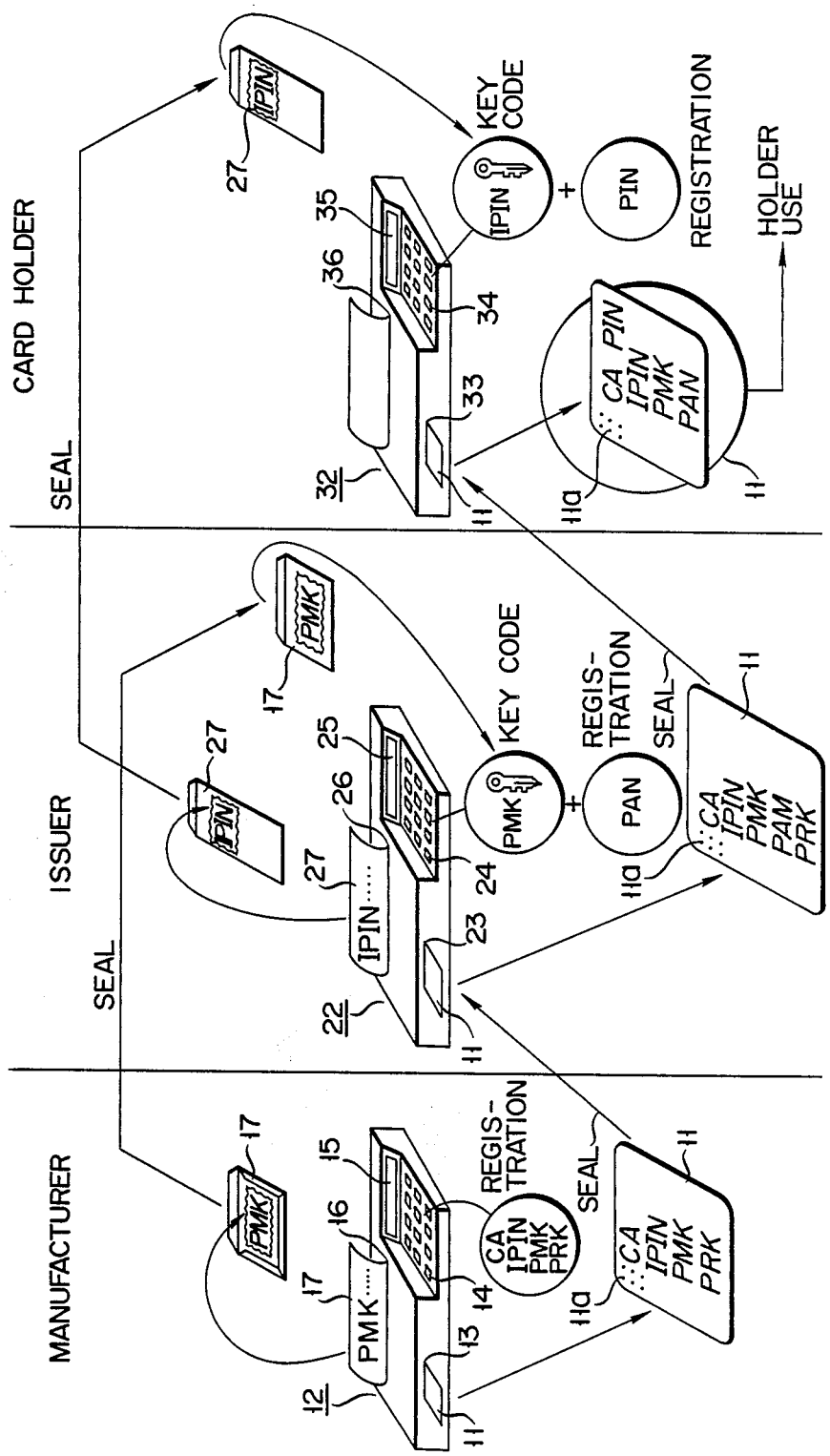
FIG. 1 is a view illustrating an IC card manufacturing step, an IC card issuing step, and a PIN registration step in an embodiment of the IC card according to the invention.

FIG. 1 shows the flow of the IC card and the card identification data, in which the IC card is manufactured and then given to an issuer, for example a bank, and the card is then sent to a card owner. The IC card manufacturer produces IC card 11, and card terminals 12, 22, 32, and 41.

The card manufacturer, after producing IC card 11, writes a predetermined code into the card 11 by using IC card manufacturing terminal 12. As will be described in detail later, this IC card 11 contains an internal IC circuit and is provided with connector or connection terminals 11a on the surface of its case. When the card 11 is inserted in IC card manufacturing terminal 12, connection terminals 11a make contact with the internal circuits of terminal 12. The card manufacturing terminal 12 contains card insertion slot 13, keyboard 14, display panel 15, and printer section 16. With data input from keyboard 14 by an operator, the various types of code, such as CA, IPIN, PMK, and PRK, are written into IC card 11. The CA (Card Authenticator) is of a random 64-bit code and is used in the encryption and decryption of messages. The IPIN (Initialization Personal Identification Number) is, for example, a 6-bit random code which is used as an identification number until a personal identification number PIN is used. PMK (Production Master Key) is a manufacturing number code, and the same PMK is used on all IC cards of one group, such as one lot unit, and is kept secret even in the factory. PRK (Private Key) is a decryption code, which, as will be explained later, corresponds on a one-to-one basis to the Public Key code, or encryption code which is written into the card terminal. When a given code is written into the IC card by the IC card issuing terminal 12, the PMK only is printed on a security code printing paper 17 by printer section 16. Then, the manufacturer seals the IC card 11 and the security code printing paper 17 in different envelopes, and mails them to the issuer. The issuer inserts the IC card 11 as he received from the manufacturer into IC card issuing terminal 22, then reads out the recorded PMK code on the security code printing paper 17, and inputs the corresponding PMK code into IC card issuing terminal 22. Also, the issuer inputs the primary account number (PAN) for the IC card 11, into IC card issuing terminal 22. IC card issuing terminal 22, like IC card manufacturing terminal 12, is provided with card insertion slot 23, keyboard 24, display panel 25, and printer section 26. The PMK code which has been written into IC card 11, and the PMK code input from keyboard 24 are compared for coincidence, and only if both codes coincide with each other, is the account number PAN written into IC card 11, and the input IPIN is printed on the security code paper 27. Then, the issuer places the IC card with the PAN as written and the security code paper with the printed IPIN in the same envelope or in separate envelopes, and sends them to the card user. When the card user receives the IC card 11 and the security code paper 27 from the issuer, he or she goes to the card issuing point, inserts his or her card into the IC card user terminal 32, and then reads the recorded contents from the security code paper 27 and inputs the codes into IC card user terminal 32. The card receiver also inputs the personal identification number (PIN) of his or her choice into IC card user terminal 32. IC card user terminal 32, like the IC card issuing terminal 22, is equipped with card insertion slot 33, keyboard 34, display panel 35, and printer section 36. The IPIN written in IC card 11 and the IPIN input from keyboard 34 are compared for coincidence, and only if they coincide, is the above-mentioned PIN written into IC card 11. As a result of the above procedure, the issuing of IC card 11 is complete, and it can now be put to actual use.

The operation of checking and writing of the check data RMK, IPIN, PIN, etc. will be described later.

[External View and Mounting of the Terminal]

Figure 2:
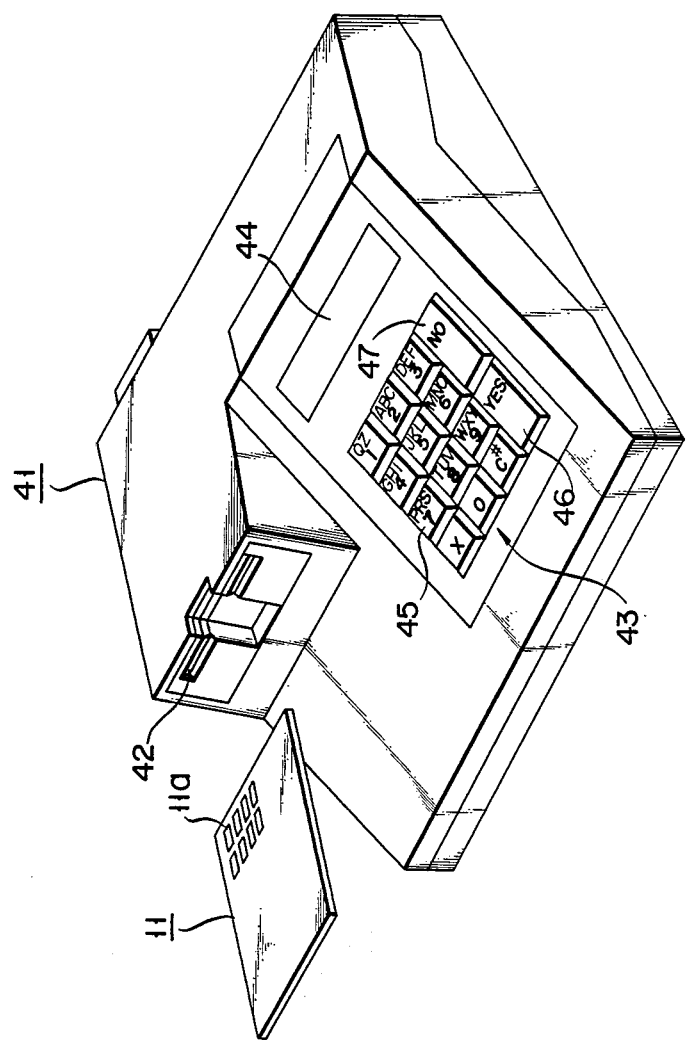
FIG. 2 is a perspective view showing an IC card and a card terminal in case when an IC card is issued as shown in FIG. 1.

FIG. 2 shows the outer appearance of a card terminal device 41 used for IC cards 11, which may be installed in a store, for example, when the terminal device for IC cards is realized according to this invention. This card terminal 41 is composed of card insertion slot 42, keyboard 43, and display section 44. The keyboard 43 uses numerical keys 45, YES key 46, and NO key 47. The internal circuits of this card terminal 41 will be explained in detail later.

[IC Card Circuit Configuration]

The configuration of the internal IC circuits of the IC card 11 will now be described with reference to FIG. 3.

Figure 3:
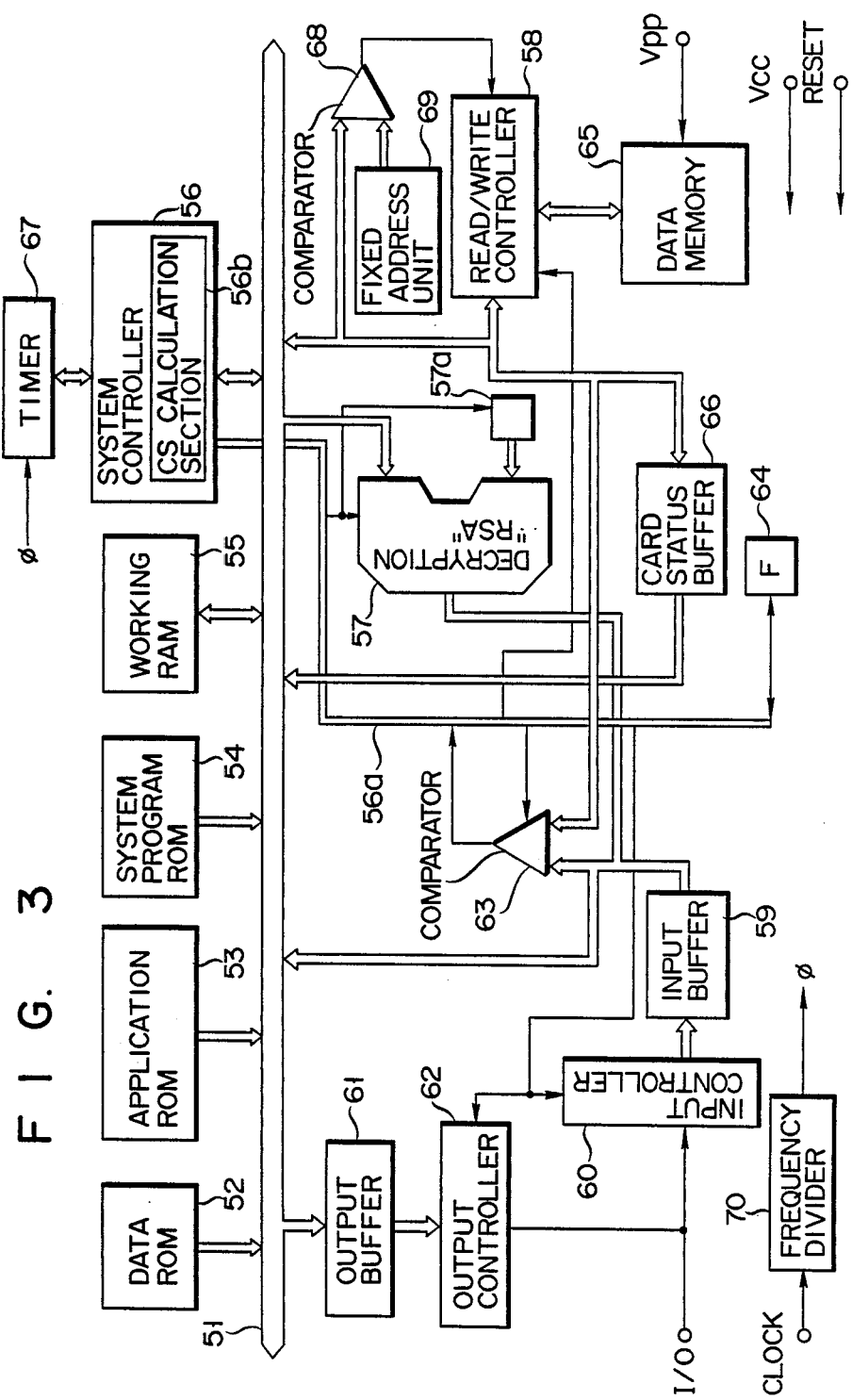
FIG. 3, is a block diagram showing the circuitry of the IC card shown in FIG. 2.

FIG. 3 shows system bus 51. Data ROM 52, application ROM 53, system program ROM 54, working RAM 55, system controller 56, decryption arithmetic unit 57, and read/write controller 58 are all connected to system bus 51. Input controller 60 is connected to this bus via input buffer 59, and output controller 62 is connected to this bus 51 via output buffer 61. Data input/output terminal I/O is connected to input controller 60 and output controller 62.

The above-mentioned ROM 52 stores all the operating conditions pertaining to card 11 itself, such as data write applied voltage, its current tolerance value and maximum application time, maximum data transmission capacity, and maximum response waiting time. When the initialization of the card itself is finished, this condition data, in conformance with a preset format, is sent to the terminal 41 side as "answer-to-reset" data. The above application ROM 53 stores card classification data APN (application name), which shows the classification of card 11. The card classification data is put into a specified format and sent out when the attribute exchange occurs with terminal 41, after initial parameters have been set in accordance with the answer-to-reset data. System program ROM 54 contains (besides every kind of system program) ACK and NAC codes, which show if the signal transmitted from terminal 41 is correct or not. System controller 56 has an internal decision area, and outputs operating commands to related circuits in accordance with the data receive signal transmitted via input buffer 59 and operation status. Decryption arithmetic unit 57 performs decryption in accordance with RSA algorithm, and it decrypts input data supplied from the terminal 41 side via input buffer 59, by means of the decryption key code (issuer's private key) stored in key code memory ROM 57a, and outputs it to comparator 63. The comparator output of this secret information comparator 63 is supplied to system control line 56a of system controller 56. This system control line 56a is connected to flag 64, which operates in accordance with the comparison results from comparator 63. Read/write controller 58 controls the write-in or read-out of data relating to data memory 65, in accordance with the commands from system controller 56. The memory data read out by this read/write controller 58 is output to comparator 63, system bus 51, or card status buffer 66. EPROM (Erasable Programmable Read Only Memory), for example, is used for this data memory 65. The codes CA, IPIN, PAN, CHN, EPD, PRK, and RTN, and status data ST are written into this memory area.

As described before in connection with FIG. 1, secret information comparator 63 compares the codes such as PMK and IPIN which have been stored in data memory 65 during the manufacturing and issuing steps, to those supplied from card terminal 41. When coincidence of data is detected by comparator 63, it is enabled to write new codes in data memory 65, while the codes in data memory 65 which are determined to be coincident are erased.

Comparator 63 compares data $CS_W$ obtained by CS calculation section 56b of system controller 56 according to write data temporarily stored in working RAM 55, for instance, by adding data byte-by-byte, and data $CS_M$ calculated in the same manner according to data written in data memory 65. When non-coincidence of compared data is detected, it is decided that there is abnormality in the preset memory area of data memory 65, and write data stored in working RAM 55 is written in a spare memory area of data memory 65.

CHN is an abbreviation of "Card Holder's Name". EPD is an abbreviation of "Expiration Date". RTN is the number of times that re-entry has been performed when incorrect data was input. Also, ST shows the current status of card 11. For example, if the manufacturing process of this card has been completed, manufacturing process data is written in, and even if the card has been issued, and the PIN has not been entered, PIN not entered is written in. The card status data ST, is arranged in the same format as the card classification data APN as stored in application ROM 53, and sent to the terminal 41 side.

Figure 4:
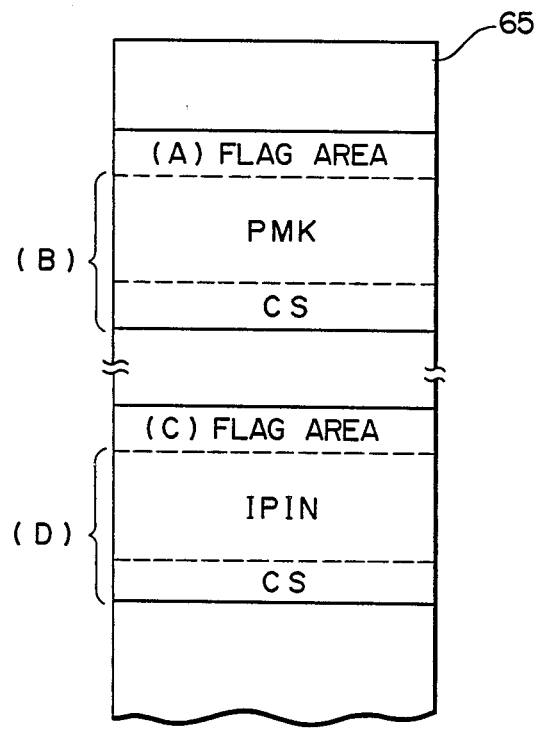
FIG. 4 is a view showing a memory area configuration of a data memory in the IC card shown in FIG. 3.

FIG. 4 shows the memory area configuration of data memory 65. A flag area is provided for each write data. Data flag data "1" which represents that the memory area has been used or flag data "0" which represents absence of data may be written in the flag area. The data memory also has a CS (Check Sum) area provided for each write data for checking the data which is written in. Data memory 65 may be other than EEP-ROM, e.g., EP-ROM.

System controller 56 is connected to timer 67. Timer 67 counts a predetermined time during normal data exchange processing when a start data write voltage supply message is output by card terminal 41. During the count operation of timer 67, if a positive response signal ACK is not supplied from terminal 41, system controller 56 will stop the data input/output for card 11. Address comparator 68 is connected to the bus line which connects read/write controller 58 and system bus line 51. Address comparator 68 always compares the unused specific address entered in fixed address unit 69 at the end of the test following completion of manufacture, and the specific address specified via system bus 51. The result of the comparison by comparator 68 is supplied to read/write controller 58. In this way, only when the comparing output is the address coincident signal due to improper use of the terminal, it clears all of the data in data memory 65, thereby preventing secret data from being read out of the card. In the situation in which IC card 11 is coupled with car terminal 41, the terminal supplies a reset signal RESET and a system clock signal CLOCK through connector (connection terminal) to the IC card. Vcc and Vpp power supplies are also supplied to it. Vcc power source is a system drive power source, and Vpp power supply is used for writing data to data memory 65. If power voltage is set up by terminal side on the basis of the answer to reset data as stored in data ROM 52. The system operation signal based on system clock signal is supplied through frequency divider 70.

[Terminal Circuit Configuration]

A circuit configuration of card terminal 41 will now be described with reference to FIGS. 5A, 5B.

In the figures, system bus 71 is coupled with sound controller 72, working RAM 73, system program ROM 74, terminal attribute ROM 75, initial parameter RAM 76, main controller 77, display drive controller 78, key controller 79, reader/writer controller 80, comparator 81, encrypting arithmetic unit 82 based on "RSA" algorithm, latch circuit 83 for latching "CA", encrypting arithmetic unit 84 of the DES system based o data encryption standard, decrypting arithmetic unit 85 of DES system, input/output (I/O) controller 86, and output buffer 88 through output controller 87, and input controller 90 through input buffer 89.

Sound controller 72 is coupled with loud-speaker 91 for sounding an alarm if such an abnormal situation occurs. The memory area of working RAM 73 stores "PAN", "CHN", and "EPD", sent from IC card 11, and other various types of data processed in terminal 41. System program ROM 74 contains various types of system programs, and "ENQ (Enquiry)" code for taking matching with IC card 11. Terminal attribute ROM 75 stores terminal code "TC" (manufacturing code, issuing code, shop code, etc.), according to the use of the terminal. Terminal code "TC" is transmitted in a predetermined format, after setting of the initial parameters according to the answer-to-reset data from code 11, and when an attribute exchange with the code 11 side is performed. Then, the answer-to-reset data from the IC card 11 side is stored in its entirety by initial parameter RAM 76. This initial RAM 76 is connected to output controller 87, input controller 90, Vpp level latch unit 92, Vpp timer latch unit 93, and Ipp level latch unit 94 via initial data transmission line 76a. Also, each latch unit is connected to its corresponding Vpp power supply 95, Vpp timer 96, or Ipp limiter 97. The output of the Vpp power supply is connected to the Vpp output terminals by way of Vpp timer 96 and Ipp limiter 97 successively. The maximum data transmission capacity of card 11 which is controlled by main controller 77, the card data maximum write voltage by Vpp power supply 95, the write voltage supply time by Vp timer 96, and the card data maximum application write current by Ipp limiter 97 are all set by the answer-to-reset data, as set in initial parameter RAM 76.

IC card operating frequency selector 98 is connected to the data transmission line 76a. The oscillating signal from oscillator 99 is supplied to this selector 98 via frequency divider 100. The oscillating signal having a predetermined frequency is output from the clock terminals. Also, timer 101 is connected to the above initial parameter RAM 76. Timer 101 counts the maximum response waiting time from the instant an enquiry signal "ENQ" or other command signal is sent from the terminal 41 side to the card 11 side, according to the answer-to-reset data sent from IC card 11 and stored in initial parameter RAM 76. During this waiting time, if some type of response signal is not received from the card 11 side, main controller 77 again directs transmitting of the above ENQ or other command signal, or directs, via reader/writer controller 80, reader/ writer mechanism unit 102 to disconnect from card 11.

System control line 77a of main controller 77 is connected to comparator unit 81, decryption arithmetic unit 82, latch circuit 83, and input/output controller 86. According to the operation status of the system, control commands are sent to every circuit unit from main controller 77. Display drive controller 78 controls display section 44 and back light 44a constructed with EL elements provided on the rear side of display section 44. Back light 44a lights up only when IC card 11 is inserted into reader/writer mechanism 44. Key controller 79 provides a key sampling signal to keyboard 43, and detects the key input signal. Then, reader/writer controller 80 controls the operation of reader/writer mechanism unit 102. Reader/writer mechanism unit 102 is provided with a card conveying motor, which conveys card 11 from card insertion slot 42 to a specified lotation, and after completion of the given processing, returns card 11 to card insertion slot 42. Unit 102 is further connected to output buffer 88, reset controller 103, Ipp level latch 94, operation frequency selector 98, and Vpp power supply 104. The terminals corresponding to these units I/O, Reset, Vpp, clock, and Vcc are set at high impedance only when IC card 11 is not inserted.

Output controller 87, which is connected to input terminals I/O via input controller 90 and output buffer 88, controls the transfer of data between card terminal 41 and IC card 11, according to the command received from main controller 77 via initial parameter RAM 76. Input controller 90 outputs the data from IC card 11 via input buffer 89 to memory device units, such as working RAM 73. Output controller 87 sends the data received from the memory device of terminal attribute ROM 75 to IC card 11 side via output buffer 88. Data input from IC card 11 via input buffer 89 is sent to comparator 81 via the bus line, and the output of that comparator is supplied to main controller 77. Further, the above output controller 87 sends the decryption data received from encrypting arithmetic unit 82, to IC card 11 via output buffer 88. Encrypting arithmetic unit 82 encrypts the data (PAN) from working RAM 73 via system bus 71, according to the public key code received from IPK (Issuer's Public Key) ROM 106, serving as data ROM. The public key code which corresponds to the PRK stored in data memory 65 of IC card 11, is already written into IPK ROM 106. This memory code is output in response to a command from main controller 77.

"CA" latched in latch circuit 83 is inputted to encrypting arithmetic unit 84 and decrypting arithmetic unit 85. Given data is inputted to encrypting arithmetic unit 84 via system bus 71. "PAN" stored in working RAM 73 is encrypted, with the key of "CA", in response to the command from main controller 77, and outputted to input/output controller 86. The data base, i.e. the encrypted data is output to the host computer, when it is connected in on-line manner. This input/output controller 86 outputs the data base, in other words, data which is encrypted when the host computer is on line, to the host computer. Input/output controller 86 decrypts the crypted data from the host computer according to the CA by decrypting arithmetic unit 85, and outputs it to system bus 71.

OPERATION OF AN EMBODIMENT OF THIS INVENTION

Figure 6A:
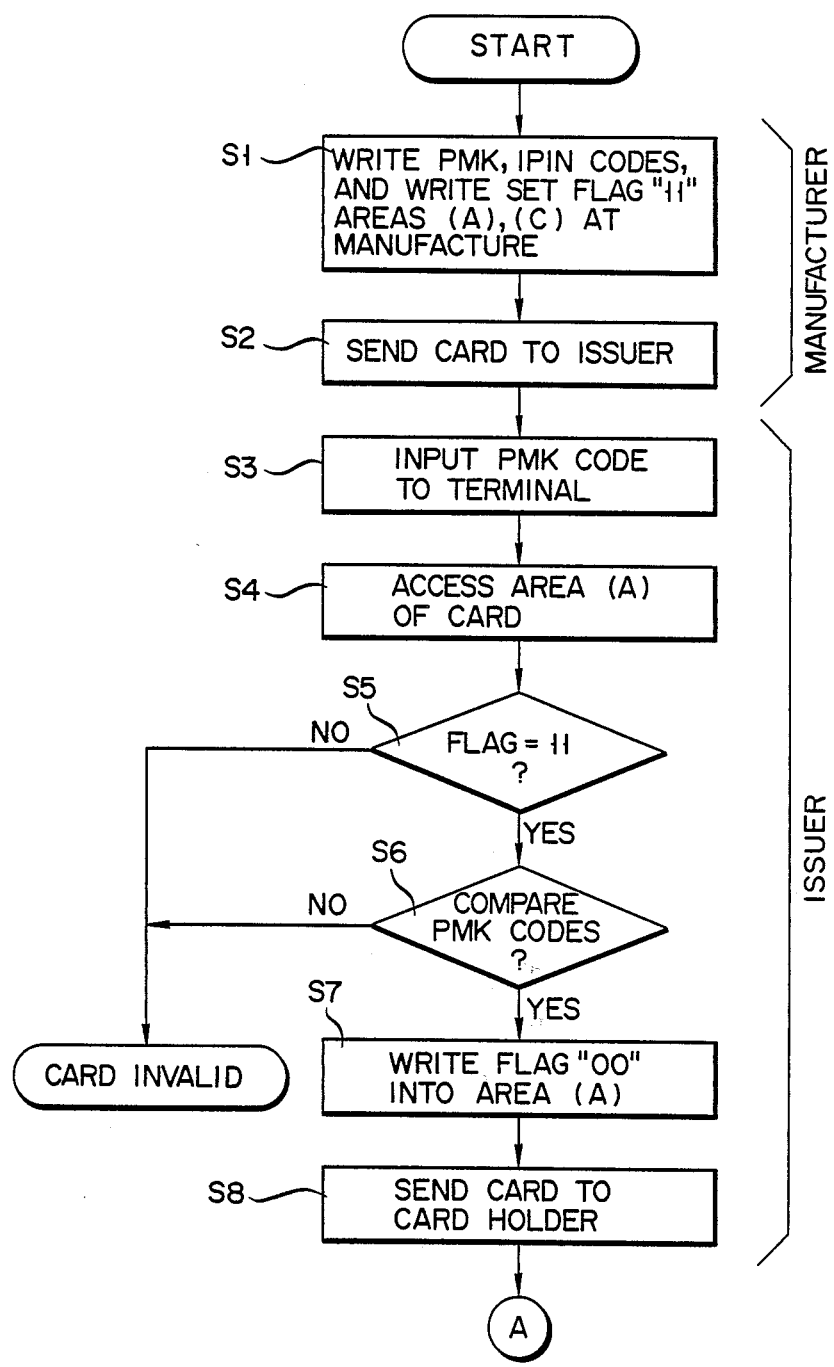
FIGS. 6A and 6B form a flow chart illustrating data check, deletion, and write operations with the IC card.
Figure 6B:
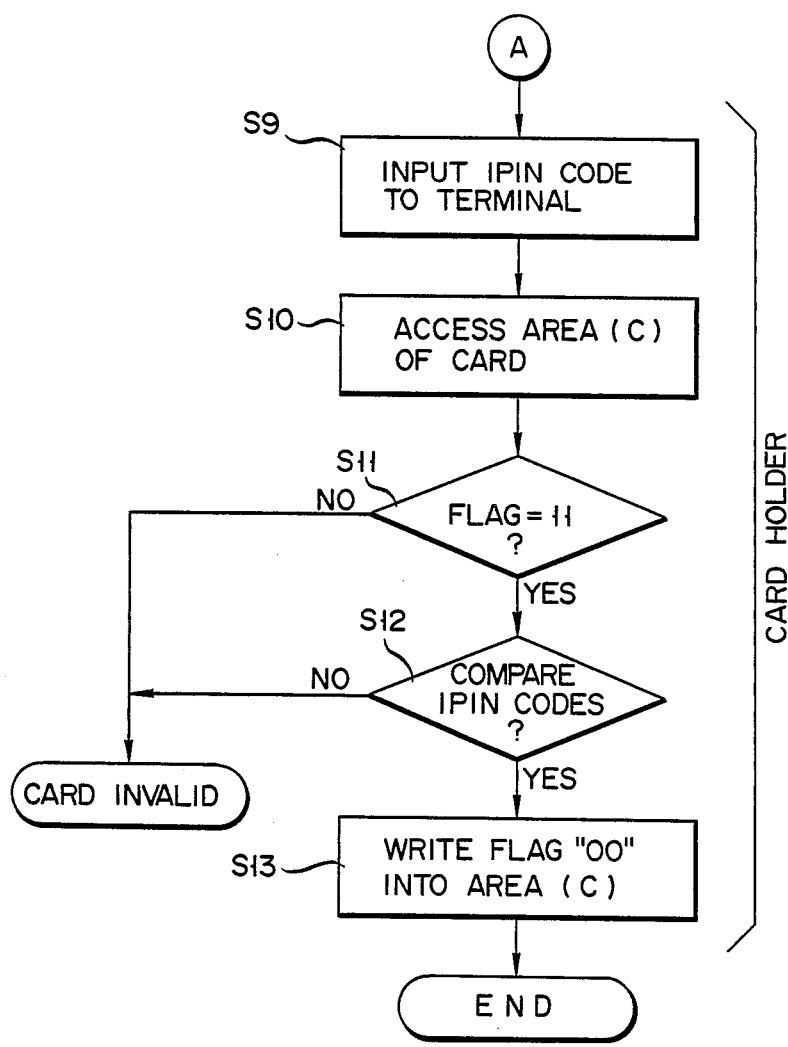

Now, the operation of writing new check data in the IC card manufacturing step, IC card issuing step and PIN registration step shown in FIG. 1 with IC card 11 and card terminal 41 based on the IC card check system of the embodiment, will be described with reference to the flow chart of FIGS. 6A and 6B.

It is assumed that each of terminals 12, 22 and 32 shown in FIG. 1 is practically the same in construction as card terminal 41 shown in FIG. 2 although they are different in the contents stored in the inner memory.

In step S1, codes PMK and IPIN are input by the IC card manufacturer (e.g., an electric apparatus manufacturer) from keyboard 43 of card terminal 41. These code are written in memory areas B and D shown in FIG. 4. In addition, flag "11" representing that the memory area has been used is written in flag areas A and C. In subsequent step S2, IC card 11 with PMK and IPIN codes registered is sent to the IC card issuer. The IC card manufacturer sents print data of PMK stored in data memory 65 to the IC card issuer separately from IC card 11.

The IC card issuer (e.g., a bank) effects writing of PAN on IC card 11 sent from the IC card manufacturer. More specifically, in step S3 print data PMK is input by the IC card issuer from keyboard 43 of card terminal 41. As a result, step S4 is executed on the side of IC card 11, in which flag area A corresponding to memory area B of data memory 65 in which PMK has been written is accessed via read/write controller 65. In subsequent step S5, a check is done as to whether there is flag data "11" in flag area A. If flag "11" has been written in flag area A, "Yes" is yielded as a result of the check in step S5. In this case, it is confirmed that code PMK has been written in corresponding memory area B. In this case, the routine goes to step S6, in which code PMK that has been supplied from card terminal 41 in step S3 and code PMK stored in data memory 65 are compared in comparator 63. If it is confirmed in step S6 that the supplied code PMK and code PMK which has been written in the IC card manufacturing step are coincident, the justice of the current IC card issuer is proved. In this case, it is enabled to write PAN in data memory 65. The IC card issuer thus supplies code PAN from keyboard 43 and store it in a predetermined memory area in data memory 65. In subsequent step S7, flag data "00" representing the absence of data is written in flag area A of data memory 65. Also, check data PMK in memory area B, which has been found to be coincident in the check of step S6, is deleted.

If flag data "11" has not been written in flag area A, the check of step S5 yields "No", confirming that PMK is not written in memory area B. Further, if it is confirmed in step S6 that the input code PMK and code PMK having been written in the IC card manufacturing step do not coincide, it is proved that the current IC card user is an unjust user having the IC card obtained by a theft or other unlawful way. In this case, and also the case noted above when the absence of the code PMK in memory area B is confirmed, the writing of new data in data memory 65 or transfer of data to or from IC card 11 is disabled, that is, IC card 11 is rendered ineffective so that it will never be used again.

In other words, unless it is found in the IC card issuing step that the code PMK supplied as check data from card terminal 41 is coincident with PMK stored in data memory 65, writing of new data PAN in data memory 65 is disabled. In addition, when the coincidence of PMK is detected, the coincident data in data memory 65 is deleted. Therefore, even in the event if IC card 11 is stolen while it is sent by mail from the manufacturer to the issuer, the coincidence of code PMK cannot be obtained in step S6 insofar as the print data PMK which is sent by separate mail can not be known, so that it is impossible to unjustly write data in data memory 65. Further, in the event of a theft of IC card 11 after the writing of code PAN in the IC card issuing step, the writing of new data in data memory 65 or re-writing of data is again impossible because cause the check data PMK in data memory 65 has been deleted in step S7. It is thus possible to prevent unjust use of IC card 11 in case of a theft of the card in the IC card manufacturing step or IC card issuing step.

When the writing of PAN and deletion of PMK have been completed in the IC card issuing step, IC card 11 is sent to the card holder in step S8. At this time, the print data IPIN which has been stored in data memory 65 in the IC card manufacturing step is sent separately from IC card to the IC card holder.

The IC card holder (i.e., customer) registers PIN on IC card 11 which has been sent from the IC card issuer. First, the separately sent print data IPIN is supplied by the IC card holder from keyboard 43 of card terminal 43. Then, step S10 is executed on the side of IC card 11, in which flag area C corresponding to memory area D of data memory 65 with IPIN registered thereon is accessed through read/write controller. Then a check is done in step S11 as to whether flag data "11" has been written in flag area C. If flag "11" has been written in flag area C, the check step S11 yields "Yes", confirming that the code IPIN has been certainly written in corresponding memory area D. In this case, the routine goes to step S12, in which the code IPIN which has been supplied from card terminal 41 in step S9 and code IPIN stored in data memory 65 are compared in comparator 63. If it is confirmed in step S12 that the input code IPIN and code IPIN written in the IC card manufacturing step are coincident, the justice of the current IC card holder is provided to enable the writing of PIN in data memory 65. The IC card holder thus supplies the code PIN from keyboard 43, the supplied code PIN being stored in a predetermined memory area of data memory 65. In subsequent step S13, flag data "00" representing the absence of data is written in flag area C of data memory 65, and the coincident code IPIN in memory area D is deleted.

If flag data "11" is not written in flag area C, the check of step S11 yields "No", confirming that IPIN is not written in memory area D. Further if it is confirmed in step S12 that the supplied code IPIN and code IPIN written in the IC card manufacturing step do not coincide, it is proved that the current IC card holder is an unjust IC card holder who has obtained the IC card by theft by like unlawful way. In this case, and also in the above case of confirmation of absence of IPIN in memory area D, the writing of new data in data memory 65 or transfer of other data to and from IC card 11 is disabled so IC card 11 is rendered ineffective and can neve be used again.

As has been shown, in the PIN registration step which is done by the IC card holder unless the code IPIN supplied from card terminal 41 does not coincide as check data with code IPIN stored in data memory 65, no new data PIN can be written in data memory 65. In addition, once the coincidence of IPIN is detected, the coincident data in data memory 65 is deleted. Therefore, even if IC card 11 is stolen during its transport from the IC card issuer to the customer by mail, the coincidence of IPIN can not be obtained in step S12 unless separately mailed print data IPIN can be known. It is thus impossible to unjustly write data in data memory 65. Further, in the event of a theft of IC card 11 after the PIN registration step, it is again impossible to write new data in data memory 65 or re-write data because the check data IPIN in data memory 65 has been deleted in step S13.

Since it is thus absolutely impossible to re-write data stored in IC card 11 even in the event of a theft of the IC card during maining thereof, unjust transaction with a stolen IC card can be perfectly prevented.

In the above embodiment the check data such as PMK and IPIN have been deleted by writing data "00" in the flag area. However, it is possible to directly clear the check data or render it data incapable of use instead of using the flag.

Further, while in the above embodiment data PMK and IPIN are deleted, the data PIN which is registered by the customer may also be deleted in case when the registered data PIN is altered. In general, it is possible to delete any data.

SECOND EMBODIMENT

Now, a different embodiment of the invention will be described with reference to FIGS. 7 and 8. In this embodiment, data to be written in data memory 65 of the IC card is stored together with its check sum. When reading out the data stored in the data memory, the check sum which is stored together with the read-out data is compared to a check sum which is based on the read-out data. If it is decided that the compared check sums are non-coincident, abnormality of data memory is alarmed.

Figure 7:
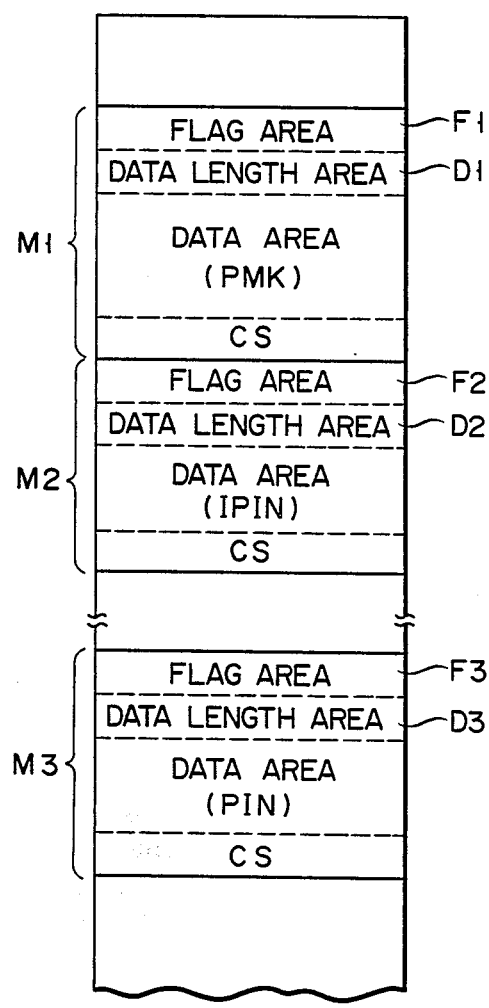
FIG. 7 is a view showing a memory area configuration of a data memory in another embodiment of the IC card according to the invention.

FIG. 7 shows the memory area configuration of data memory 65 in this embodiment. The memory has a plurality of memory areas M1, M2, . . . in which the codes PMK, IPIN, PIN, etc. are written. Individual memory areas M1, M2, . . . respectively have flag areas F1, F2, . . . for indicating that the memory area has been or has not been used and data length areas D1, D2, . . . for indicating the length of stored data. Data PMK, IPIN, PIN, etc. are written in corresponding memory areas M1, M2, . . . together with CS data calculated by CS calculation section when writing these data. Secret information comparator 63 compares CS data based on write data temporarily stored in working RAM 55 when writing data and CS data based on data written in data memory 65. Or it compares CS data stored together with the read-out data when reading out data and CS data based on read-out data. If it is decided that the compared data are non-coincident, it is determined that there is abnormality in the memory area M of data memory 65, and an "abnormality-of-memory" message is transmitted from system controller 56 to card terminal 41.

Figure 8:
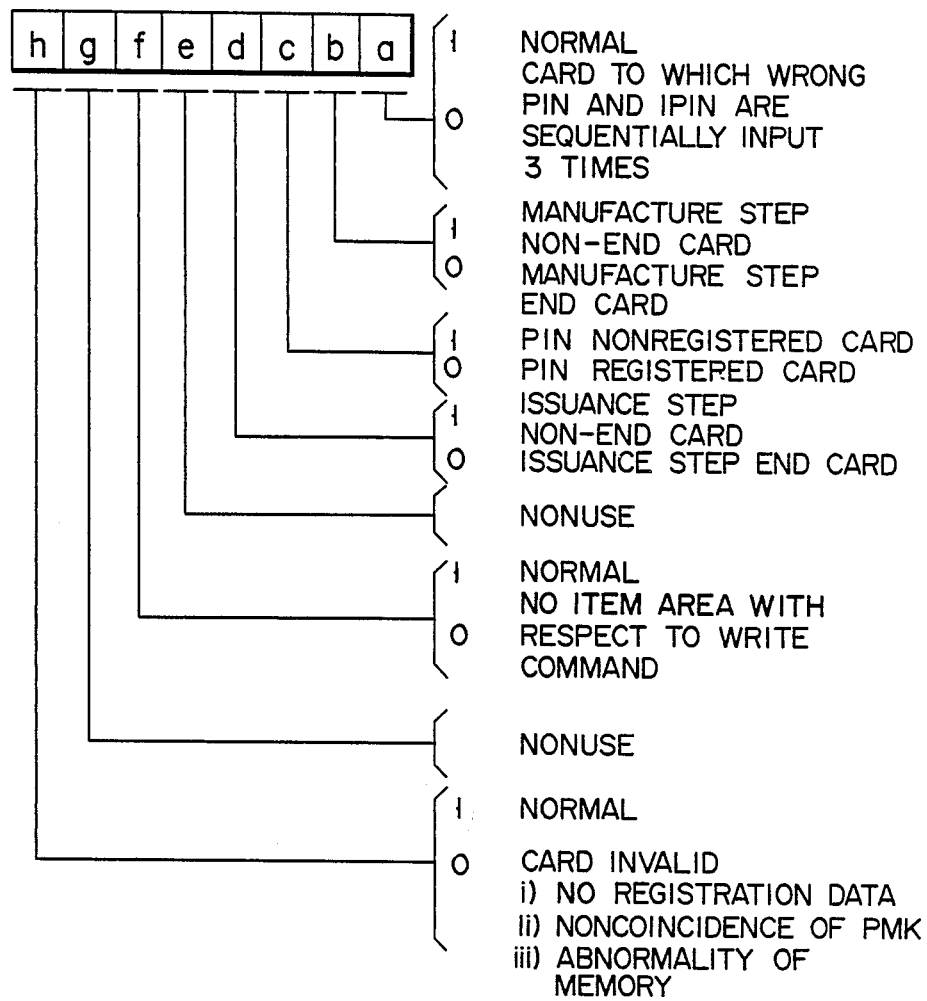
FIG. 8 is a view showing code contents of card status data ST stored in the embodiment of the IC card shown in FIG. 7.

FIG. 8 shows the code contents of card status data ST stored in data memory 65. This card status data ST is an 8-bit code. Of the eight bits, bits b, c and d represent the card status at the end of IC card manufacturing step, PIN registration step and IC card issuing step, respectively, shown in FIG. 1. Bit a represents a status in which the code PIN stored in data memory 65 in the PIN registration step and code PIN input from card terminal 41 are non-coincident consequtively three times. Bit f represents a state in which there is no vacant memory area with respect to a data write command from card terminal 41. Bit h represents the invalidity of the IC card due to no registration data area corresponding to card terminal 41, non-coincidence of PMK or abnormality of data memory 65. Bits e and g are non-used bits. This card status data ST is transmitted to card terminal 41 in a data format like that of APN stored in application ROM 53. The timing of transmission of the data is set immediately after the answer-to-reset processing executed when IC card 11 is placed in card terminal 41.

Figure 5A:
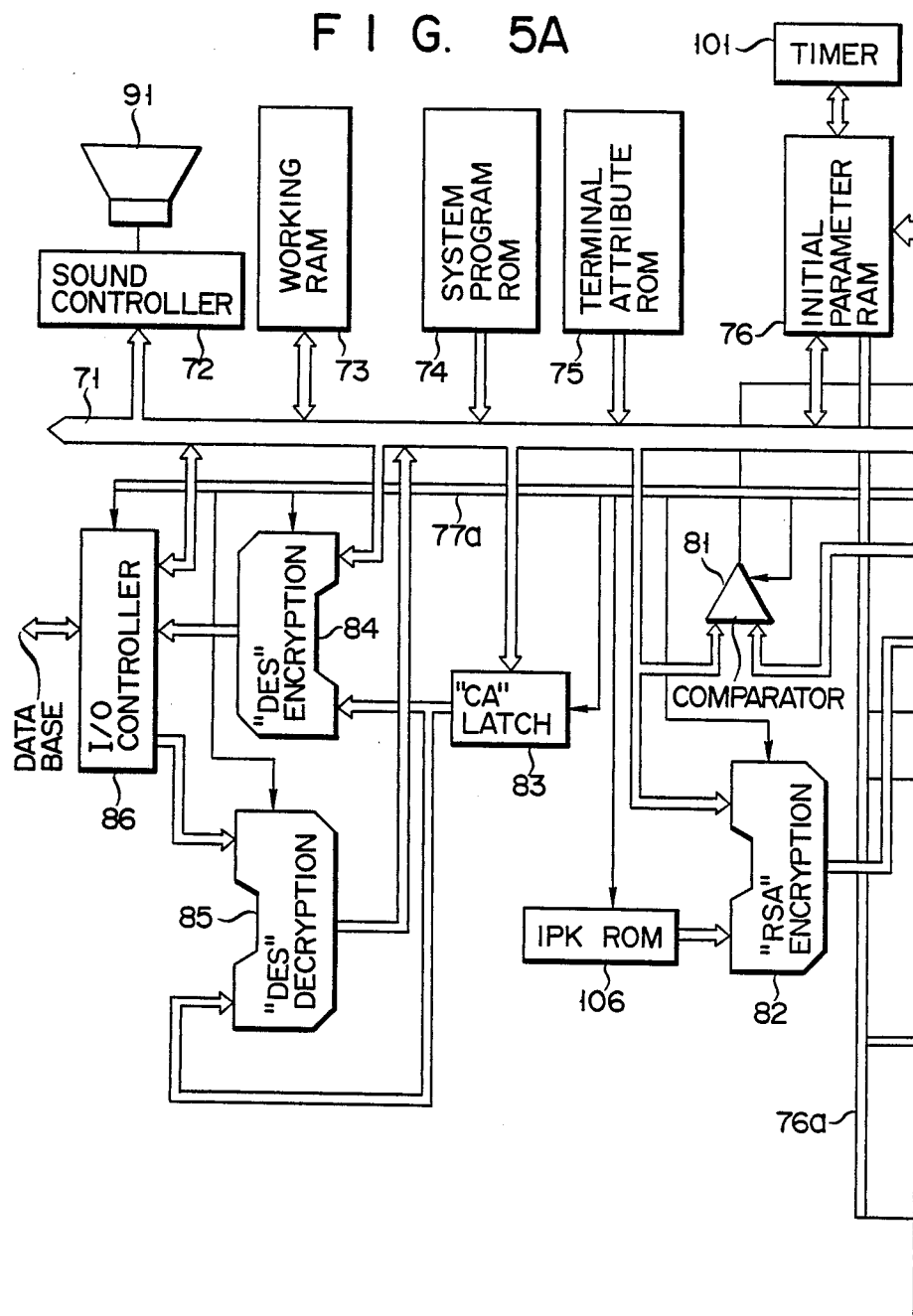
FIGS. 5A and 5B form a block diagram showing the circuit construction of the card terminal shown in FIG. 2.
Figure 5B:
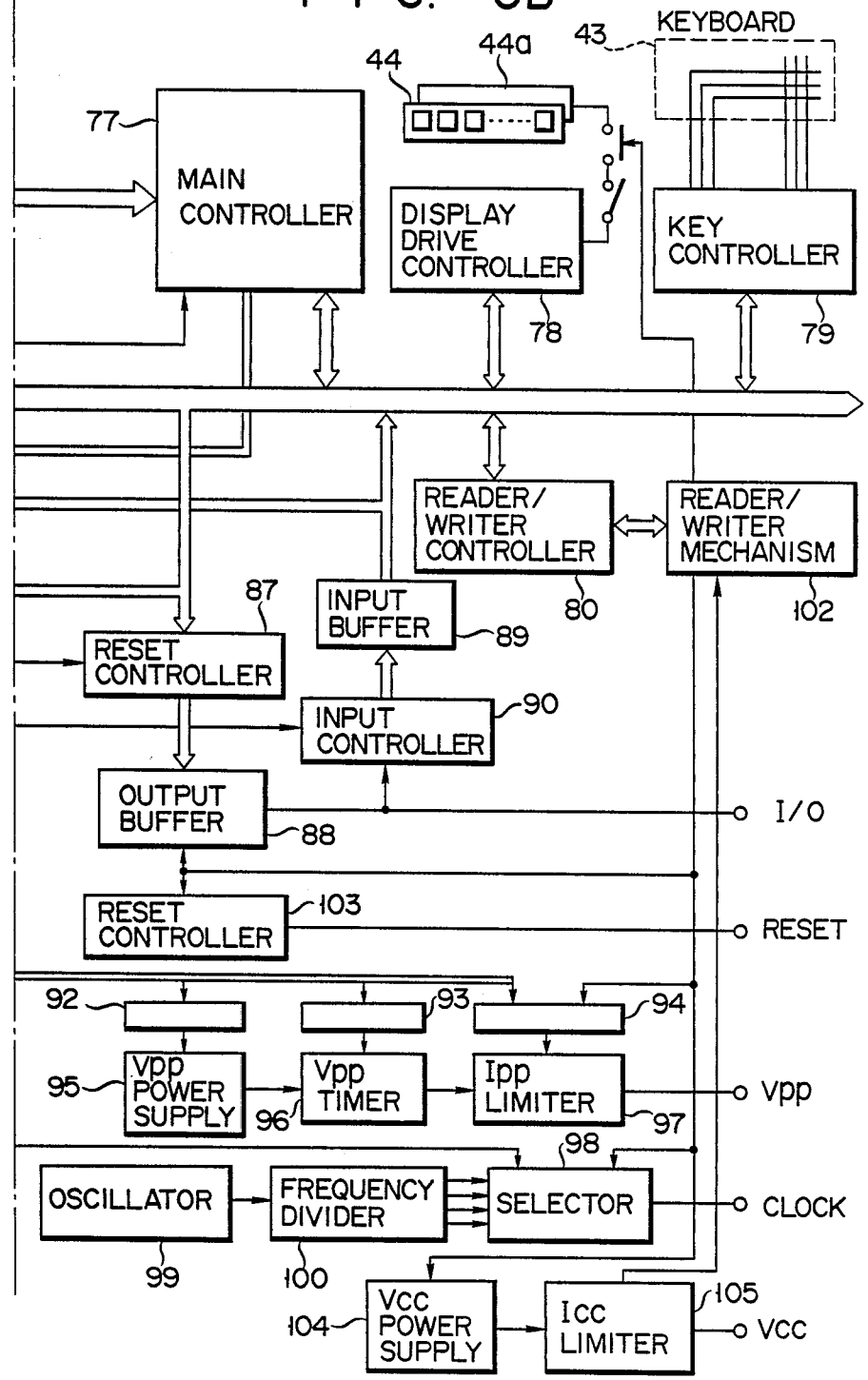

The construction of the IC card and card terminals other than those shown in FIGS. 7 and 8 is the same as shown in FIGS. 3, 5A and 5B, so its detailed description is omitted.

Now, the IC card data check operation in the above embodiment will be described.

WRITE DATA CHECK OPERATION

First, an operation of writing PMK at the time of manufacturing, IPIN at the time of issuance and PIN at the time of PIN registration on IC card 11 will be described.

To write PMK on IC card 11 at the time of the manufacture thereof, the code PMK is supplied from card terminal 41, and it is transmitted to system program ROM 74 as PMK-write command through output buffer 88 and I/O terminal to IC card 11. In IC card 11, the PMK-write command is supplied through input buffer 59. The data PMK is thus stored in working ROM 55, and it is supplied to read/write controller 58.

As a result, flag area F1 of data memory 65 shown in FIG. 4 is accessed, and flag data "11" representing that the memory area has been used is written in flag area F1. Subsequently, the code PMK and CS data calculated in CS calculation section 56a of system controller 56 are written in memory area M1 of flag area F1 through read/write controller 58. At this time, PMK written in memory area M1 is read out once through read/write controller 65, and CS data based on the read-out PNK is calculated in CS calculation section 56a of system controller 56. The CS data based on the read-out PMK is supplied to one input terminal of comparator 63 to be compared to CS data stored in working RAM 55. If the CS data based on the write PMK from card terminal 41 and CS data based on PMK stored in memory area M1 of data memory 65 coincide, it is confirmed that the data PMK is correctly written in data memory 65. Then, the following data exchange with card terminal 41 is executed.

If the CS data based on the write PMK supplied from card terminal 41 and CS data based on PMK stored in memory area M1 of data memory 65 do not coincide, it is confirmed that the data PMK is not correctly written. As a result, a decision is made that there is abnormality in memory area M1. System controller 56 thus transmits an "abnormality-of-memory" message to card terminal 41 and writes data "0" in bit area h of card status data ST shown in FIG. 8. As a result, in card terminal 41 the "abnormality-of-memory" message transmitted from the side of IC card 11 is displayed on display section 44 through display drive controller 78. Thus, the person who inputted PMK in the IC card manufacturing step can know that it is impossible to write data in IC card 11.

When writing IPIN and PIN in data memory 65 of IC card 11 in the IC card issuing step and PIN registration step after the completion of writing of PMK in the IC card manufacturing step, the data IPIN and PIN may be written in corresponding memory areas M2 and M3 in the same manner as when PMK is written in memory area M1. When non-coincidence of CS data compared in comparato 63 is detected at the time of the writing of IPIN or PIN, an "abnormality-of-memory" message from IC card terminal 11 is provided from card terminal 41 in the manner as described above.

READ DATA CHECK OPERATION

Now, an operation of reading out the written data at the time of an actual transaction with IC card 11 after the completion of writing of data PMK, IPIN, PIN, etc. in data memory 65 of the IC card through the above write data check operation will be described.

Assuming that IC card 11 according to the invention is a cash card, to check the code PIN with respect to card terminal 41 which is provided in a bank or the like, PIN stored in memory area M3 of data memory 65 is read out through read/write controller 58, and CS data based on the read-out data PIN is calculated in CS calculation section 56a in system controller 56. When new CS data based on PIN read out from data memory 65 and stored CS data corresponding to PIN read out from memory area M3 (i.e., CS data corresponding to true PIN calculated at the time of PIN writing) are compared in comparator 63. When the CS data compared in comparator 63 are found to be coincident, it is confirmed that PIN read out from data memory 65 is coincident with the data PIN written in the PIN registration step, that is, it is decided that correct data PIN is stored in memory area M3 of data memory 65. In consequence, IC card 11 is subjected to comparison between PIN read out from data memory 65 and PIN supplied form card terminal 41.

If it is found that the CS data compared in comparator 63 are non-coincident, it is confirmed that PIN read out from data memory 65 is non-coincident with PIN written in the PIN registration step. In this case, it is decided that altered data due to such cause as static electricity, etc., is stored as data PIN in memory area M3 of data memory 65. In this case, system controller 56 transmits an "abnormality-of-memory" message to card terminal 41 and writes data "0" in bit area h of card status data ST shown in FIG. 8. Consequently, at card terminal 41 the "abnormality-of-memory" message transmitted from the side of IC card 11 is displayed on display section 44 through display drive controller 78. The person who inputted PIN to card terminal 44 (i.e, customer of a bank) can know that there is abnormality in the memory data stored in IC card 11 before proceeding to an actual money transaction.

It is to be understood that with the IC card having the above construction it is possible to have knowledge as to whether data necessary for the transaction is accurately stored in data memory 65 before proceeding to the actual transaction with the IC card. Thus, there is no possibility that data exchange for transaction with IC card is done on the basis of erroneous memory data.

The above embodiment has been described only in connection with means for displaying an "abnormality-of-memory" message at card terminal 41 to inform of abnormality of data stored in data memory 65 when the abnormality is confirmed. At this time, data "0" is written in bit area h of card status data ST shown in FIG. 8. Therefore, when IC card 11 in this state is to be utilized again, it is recognized that there is already an abnormality-of-bit in card status data ST, that is, the abnormality of the card memory ca be known in the initial state after placing the IC card 11 at the card terminal.

EFFECTS OF THE INVENTION

As has been described in the foregoing, when it is found that check data preliminarily stored in a memory in the IC card and check data supplied from a card terminal are coincident, the coincident check data stored in the memory in the IC card is immediately deleted. Therefore, even in the event of a theft of the IC card, for instance during transport of the IC card through the IC card manufacturing step and issuing step to a customer, writing or reading of data in or out of the IC card can never be done for the check data has been deleted, so that it is possible to perfectly prevent unjust transaction with the IC card.

Further, according to the invention write data is stored in the IC card data memory together with a check sum of that data, and at the time of reading of the stored data from the data memory the check sum stored together with the read-out data is compared with a check sum based on the read-out data in order to inform of abnormality of the data memory in the event of decision of non-coincidence of the compared check sums. Therefore, in case when there occurs occasional alternation of the data stored in the IC card data memory, there is no possibility that a transaction with the IC card is effected on the basis of the erroneous data, but the abnormality of the IC card data memory can be known in advance.

What is claimed is:

1. An IC card comprising:
   memory means having at least one memory area for storing secret data therein;
   means for reading out data stored in said memory means;
   first comparator means for checking whether externally supplied data and data read out by said reading means are coincident; and
   means for substantially erasing said secret data stored in said memory means when the coincidence of data compared in said first comparator means is detected.

2. An IC card according to claim 1, wherein the secret data stored in said memory means is information data for checking the validity of at least one IC card holder.

3. An IC card according to claim 2, wherein said identification data is production master key (PMK) data for checking the validity of an IC card holder in the manufacturing of an IC card, and said PMK data is deleted upon completion of delete IC card manufacturing stage.

4. An IC card according to claim 3, wherein said identification data is initialization personal identification number (IPIN) data for checking the validity of an IC card holder in an IC card issuing of an IC card, and said IPIN data is deleted upon completion of a regular IC card issuing stage.

5. An IC card according to claim 1, wherein each said memory area of said memory means has a flag area for storing flag data, said flag data representing that corresponding secret data can not be used, said secret data being deleted in effect by said flag data.

6. An IC card according to claim 1, which further comprises:
   calculating means for calculating check sum data of data to be written in said memory means;
   means for writing said check sum data calculated by said calculating means together with said data in said memory means; and
   second comparator means for comparing check sum data calculated by said calculating means before writing of data in said memory means and check sum data stored in said memory means, thereby effecting a check as to whether data is correctly written in said memory means.

7. An IC card according to claim 6, which further comprises:
   means for providing a signal representing abnormality of said memory means to the outside of said IC card when non-coincidence of data compared by said second comparator means is detected.

8. An IC card according to claim 1, wherein said secret data stored in said memory means is supplied from a card terminal o which said IC card is attached.

* * * * *